(12) United States Patent
Ishikawa

(10) Patent No.: US 8,970,927 B2
(45) Date of Patent: *Mar. 3, 2015

(54) IMAGE READING APPARATUS

(71) Applicant: Brother Kogyo Kabushiki Kaisha, Nagoya (JP)

(72) Inventor: Hiroko Ishikawa, Handa (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/851,098

(22) Filed: Mar. 26, 2013

(65) Prior Publication Data

US 2014/0092453 A1    Apr. 3, 2014

(30) Foreign Application Priority Data

Sep. 28, 2012    (JP) ................................. 2012-215548

(51) Int. Cl.
| *G06K 15/00* | (2006.01) |
| *G06F 3/12* | (2006.01) |
| *H04N 1/04* | (2006.01) |
| *G03G 15/20* | (2006.01) |
| *G03G 15/00* | (2006.01) |
| *B65H 1/08* | (2006.01) |
| *B65H 29/66* | (2006.01) |
| *B65H 7/02* | (2006.01) |
| *B42C 13/00* | (2006.01) |
| *H04N 1/12* | (2006.01) |

(52) U.S. Cl.
CPC ............ *H04N 1/121* (2013.01); *G03G 15/602* (2013.01)
USPC .......... 358/498; 358/496; 358/1.13; 358/1.14; 399/323; 399/389; 271/126; 271/65; 271/265.01; 412/12

(58) Field of Classification Search
USPC ................ 358/1.14, 496, 1.13; 399/323, 389; 271/126, 65, 265.01; 412/12
See application file for complete search history.

(56) References Cited

U.S. PATENT DOCUMENTS

| 5,634,635 | A | | 6/1997 | Kobayashi et al. |
| 5,758,040 | A | * | 5/1998 | Ichimura et al. ............. 358/1.14 |
| 6,722,648 | B2 | * | 4/2004 | Tsusaka et al. .................. 271/65 |
| 8,237,997 | B2 | * | 8/2012 | Okumura ...................... 358/496 |
| 8,274,673 | B2 | * | 9/2012 | Okumura et al. ............ 358/1.13 |

(Continued)

FOREIGN PATENT DOCUMENTS

| JP | H05-307293 A | 11/1993 |
| JP | H08-067412 A | 3/1996 |

(Continued)

*Primary Examiner* — Charlotte M Baker
*Assistant Examiner* — Rury Grisham
(74) *Attorney, Agent, or Firm* — Merchant & Gould PC

(57) ABSTRACT

An image reading apparatus includes: a reading unit; a feeding unit; a carriage; a motor-side transmission gear for transmitting power from a motor; a carriage-side transmission gear for transmitting the power to the carriage; a feeding unit-side transmission gear for transmitting the power to the feeding unit; a switching gear switched between a meshing state with the carriage-side transmission gear at a carriage-side position and a meshing state with the feeding unit-side transmission gear at a feeding unit-side position; and a control device for performing: a first switching process for meshing the switching gear with the feeding unit-side transmission gear; a second switching process for meshing the switching gear with the carriage-side transmission gear; and an initialization process of the reading unit.

16 Claims, 6 Drawing Sheets

(56) References Cited

U.S. PATENT DOCUMENTS

| | | | |
|---|---|---|---|
| 2002/0038933 A1* | 4/2002 | Tsusaka et al. | 271/126 |
| 2006/0239731 A1* | 10/2006 | Suzuki et al. | 399/389 |
| 2007/0116498 A1* | 5/2007 | Nakano et al. | 399/323 |
| 2008/0122166 A1* | 5/2008 | Fukube | 271/265.01 |
| 2009/0081001 A1* | 3/2009 | Ota et al. | 412/12 |

FOREIGN PATENT DOCUMENTS

| | | |
|---|---|---|
| JP | H10-051598 A | 2/1998 |
| JP | 2006-086817 A | 3/2006 |
| JP | 2008-153837 A | 7/2008 |
| JP | 2012-90007 A | 5/2012 |

\* cited by examiner

IMAGE READING APPARATUS

CROSS-REFERENCE TO RELATED APPLICATIONS

This application claims priority from Japanese Patent Application No. 2012-215548 filed on Sep. 28, 2012, the entire subject matter of which is incorporated herein by reference.

TECHNICAL FIELD

The invention relates to an image reading apparatus, and more specifically, to an image reading apparatus configured to drive a feeding device for feeding a sheet of document to a reading unit such as CIS, and a moving device for moving the reading unit with power from one motor.

BACKGROUND

There have been proposed an image reading apparatus capable of driving a feeding device (feeding unit), which feeds a sheet-shaped document to a reading unit such as CIS, and a moving device (carriage), which moves the reading unit, with power from one motor. According to the image reading apparatus, a position of a planet gear that transmits a driving force of the motor, is switched between a feeding unit-side position, at which the planet gear transmits the power to the feeding unit, and a carriage-side position, at which the planet gear transmits the power to the carriage. Thereby, it is possible to operate the feeding unit and the carriage by one motor.

SUMMARY

In the above-described related-art image reading apparatus, however, in a case where a reading operation is not normally ended, the carriage may not be moved to a predetermined position at which the reading unit is initialized, even when the motor is rotated by a predetermined amount, for example, by a predetermined number of steps. When the carriage is unable to be moved to the predetermined position, it may not be possible to appropriately perform the initialization process.

Therefore, illustrative aspects of the invention provide a technology for appropriately moving a carriage to a predetermined position when a motor is enabled to move the carriage for initialization process of a reading unit, even though a reading operation is not normally ended.

According to one illustrative aspect of the invention, there is provided an image reading apparatus comprising: a reading unit configured to read an image of a document; a feeding unit configured to feed the document; a carriage configured to hold the reading unit and move the reading unit in a predetermined direction; a motor; a motor-side transmission gear configured to transmit power supplied from the motor; a carriage-side transmission gear configured to transmit the power to the carriage when executing a moving reading of moving the carriage to read the image of the document; a feeding unit-side transmission gear configured to transmit the power to the feeding unit when executing a feeding reading of reading the image of the document that is fed by the feeding unit; a switching gear; and a control device. The switching gear is configured to: mesh with the carriage-side transmission gear at a carriage-side position, in which the motor-side transmission gear and the carriage-side transmission gear are coupled at a state where the carriage is located at a feeding reading position that is a document reading position, when executing the feeding reading; and mesh with the feeding unit-side transmission gear at a feeding unit-side position, in which the motor-side transmission gear and the feeding unit-side transmission gear are coupled, when executing the moving reading, wherein the switching gear is configured to switch between a meshing state with the carriage-side transmission gear and a meshing state with the feeding unit-side transmission gear. The control device is configured to perform: a first switching process for meshing the switching gear with the feeding unit-side transmission gear before performing an initialization process of the reading unit; a second switching process for meshing the switching gear with the carriage-side transmission gear after performing the first switching process; and the initialization process of the reading unit after performing the second switching process.

According to the above configuration, when starting to drive the motor for the initialization process of the reading unit, the control device performs the first switching process for enabling the switching gear to mesh with the feeding unit-side transmission gear, for example, enables the switching gear to mesh with the feeding unit-side transmission gear and then the switching gear is meshed with the carriage-side transmission gear. Therefore, even when a reading operation is not normally ended and a position of the carriage is thus unclear, the carriage is surely located at the feeding reading position upon performing the initialization process. Accordingly, the control device is able to appropriately move the carriage to a predetermined position for the initialization process.

DETAILED DESCRIPTION

Exemplary embodiments of the invention will now be described with reference to the drawings.

First Exemplary Embodiment

In the below, a first exemplary embodiment will be described with reference to FIGS. 1 to 6.

1. External Configuration of Multi-Function Device

Figure 1:
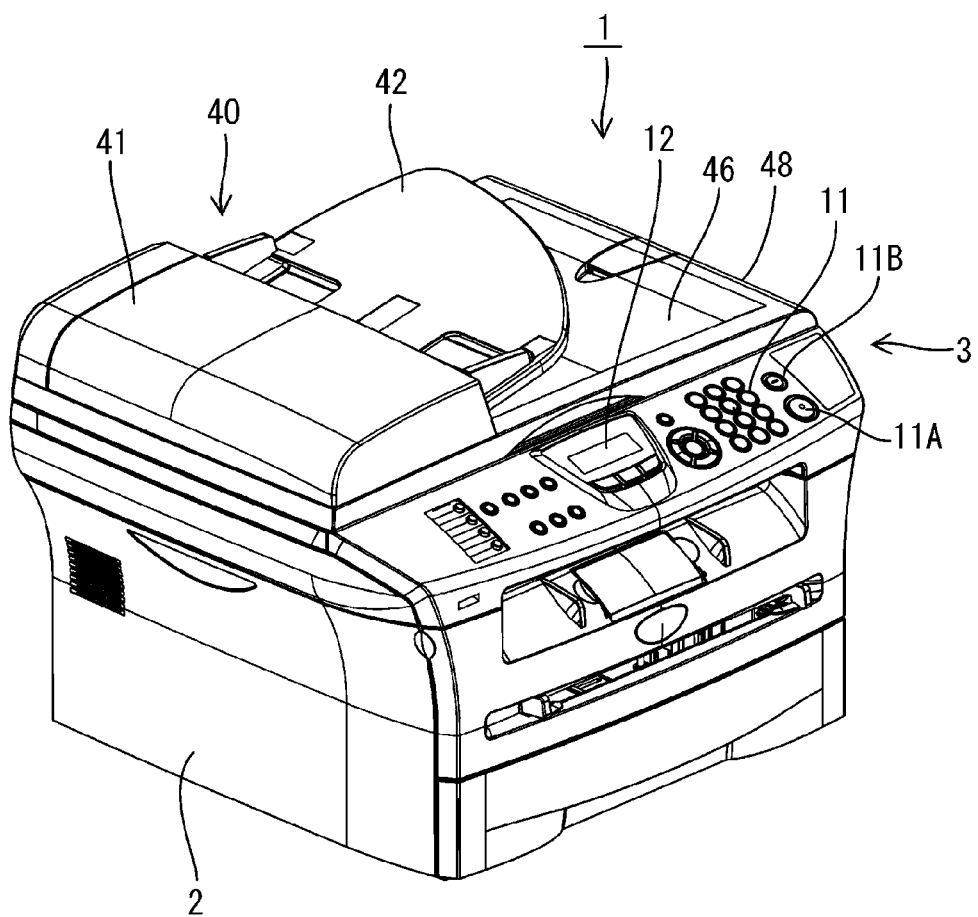
FIG. 1 is a perspective view showing an appearance of a multi-function device according to a first exemplary embodiment.

A multi-function device 1 shown in FIG. 1 is a multi-functional peripheral apparatus having printer, scanner (document reading), copying, facsimile functions and the like. The multi-function device 1 is an example of an image forming apparatus.

Figure 2:
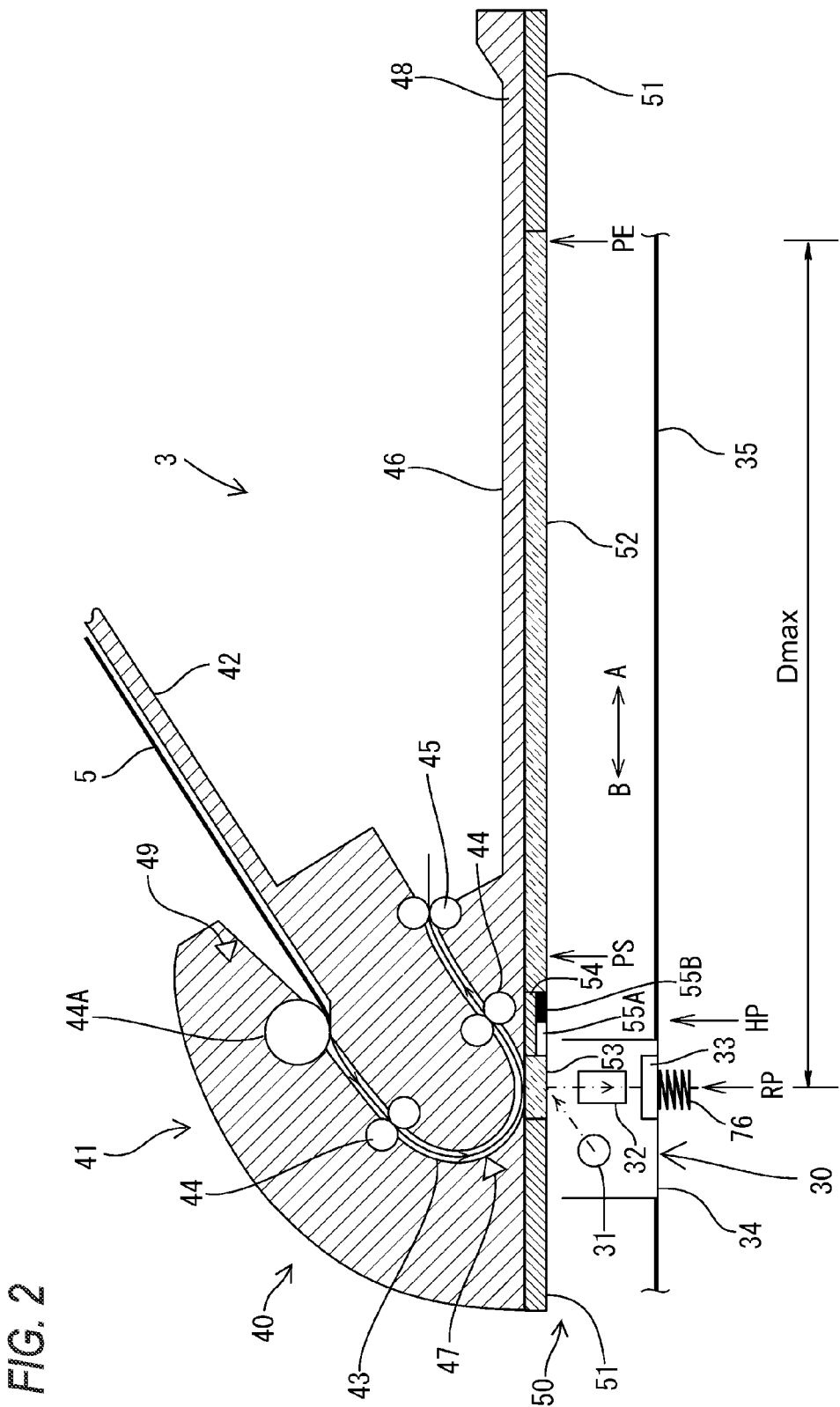
FIG. 2 is a schematic sectional view of an image reading apparatus of the multi-function device.

As shown in FIG. 1, the multi-function device 1 includes an image reading apparatus 3 configured to read a document. The image reading apparatus 3 is provided at the upper of a main body part 2 of the multi-function device 1. As shown in FIG. 2, the image reading apparatus 3 includes a reading unit 30, a carriage 34, an automatic document feeder (ADF) device 40, a document setting unit 50, a reading driving unit 60 (refer to FIG. 5) and the like. The image reading apparatus 3 has, as an image reading mode, a moving reading mode (which is an example of the moving reading), at which an image is read with moving the carriage 34, and a feeding reading mode (which is an example of the feeding reading), at which a document fed by feeding units 44, 45 (refer to FIG. 2) is read. Incidentally, the image reading apparatus 3 is not limited to a part of the multi-function device 1. For example, the image reading apparatus may be a stand-alone scanner apparatus or copier.

As shown in FIG. 2, the document setting unit 50 includes an underframe 51, a first platen glass (which is an example of the reading platen) 52 made of a transparent glass plate, a second platen glass 53 and an intermediate frame 54 that is arranged at the intermediate of the glasses 52, 53. An upper surface of the first platen glass 52 is covered by a rotatable document cover 48.

The intermediate frame 54 is provided with a mark 55 (which is an example of the detection member) for detecting a home position HP. The mark 55 includes a white tape 55A and a black tape 55B aligned in a sub-scanning direction. A position at which data read by the reading unit 30 is changed from black to white (or from white to black) is detected as the home position HP. Here, the home position HP may become a standby position by which the reading unit 30 stands when the reading unit 30 does not perform an image reading process of reading an image of a document 5 set on the first platen glass. Further, the home position may become a reference position of moving control of the carriage 34 when performing an FB reading operation.

That is, when a driving amount (the number of driving steps, in this exemplary embodiment) of driving the motor 62 after the home position HP is detected by the reading unit 30 reaches a predetermined driving amount, the reading unit 30 starts a reading scanning of the document 5. In other words, when the motor 62 is driven by a predetermined number of FB reading starting steps and thus the reading unit 30 reaches a reading starting position PS shown in FIG. 2 from the home position HP, the reading unit 30 starts a reading scanning of the document 5 that is set on the first platen glass. Also, when the motor 62 is driven by a predetermined number of FB reading ending steps and thus the reading unit 30 reaches a reading ending position PE shown in FIG. 2 from the home position HP, the reading unit 30 ends the reading scanning of the document 5. Like this, the home position HP is a reference position when the reading unit 30 performs the reading scanning. Therefore, the detection process of the home position HP is performed as an example of the initialization process of the reading unit 30.

The document cover 48 is connected to a rear-upper side (a side at which an operation unit 11, a display unit 12 and the like are provided is referred to as a front side) of the main body part 2 of the multi-function device 1 such that the document cover 48 can be rotated between a close posture, at which the first platen glass 52 is closed, and an open posture, at which the first platen glass 52 is opened. The ADF device 40 is provided on the document cover 48.

As shown in FIG. 2, the ADF device 40 includes an ADF cover 41, a document tray (sheet feeding tray) 42, a feeding path 43, a variety of rollers such as feeding rollers 44, a feeder roller 44A, sheet discharge rollers 45 and the like, and a sheet discharge tray 46 using an upper surface of the document cover 48. The ADF device 40 is configured to feed documents 5, which are set on the document tray 42, one at a time, and to convey the document to pass on the second platen glass 53 and to discharge the document onto the sheet discharge tray 46. Further, the ADF device 40 includes: a rear sensor 47 (which is an example of the document detection unit and the downstream-side detection unit) such as photo sensor for detecting the document 5 fed by the feeding rollers 44; and a front sensor 49 (which is an example of the document detection unit and the setting detection unit) such as photo sensor for detecting the document 5 that is set on the document tray 42. Here, the feeding path 43, the feeding rollers 44, the feeder roller 44A and the sheet discharge rollers 45 correspond to the feeding unit feeding the document 5. Incidentally, the document tray 42 and/or the sheet discharge tray 46 may also configure the feeding unit.

As shown in FIG. 2, the reading unit 30 is provided below the document setting unit 50. Here, the reading unit 30 is configured to read a document by a CIS (Contact Image Sensor) type. The reading unit 30 includes: a linear image sensor 33 having a plurality of light receiving elements vertically aligned in a linear shape with respect to a drawing sheet; a light source 31 having light emitting diodes of three colors (RGB) and the like; and a rod lens array 32 imaging reflected light, which is reflected on the document 5 and the like, on the respective light receiving elements of the linear image sensor 33. The carriage 34, which holds the reading unit 30, is coupled to a timing belt 35 and is configured to move in arrow A and B directions (which are examples of the feeding reading position direction) as the timing belt 35 moves. The timing belt 35 is driven by the reading driving unit 60 (which will be described later) through a sprocket and the like (not shown). Incidentally, the reading unit 30 is not limited to the CIS type and may be a so-called CCD type using a reduction optical system and CCD (charge-coupled device) image sensor.

When reading the document 5 set on the first platen glass 52, e.g., when executing the moving reading mode, the reading unit 30 reads the document 5 with the reading unit 30 being conveyed from the home position HP in a direction (the A direction in FIG. 2) parallel with a platen surface of the first platen glass 52 at constant speed by the carriage 34 coupled to the timing belt 35. At this time, a reading range in the moving direction of the carriage 34 is from the reading starting position PS to the reading ending position PE shown in FIG. 2. On the other hand, when reading the document 5 fed by the ADF device 40, e.g., when executing the feeding reading mode, the reading unit 30 reads the document 5 with being held at a feeding reading position RP just below the second platen glass 53 by the carriage 34.

The multi-function device 1 is provided on its front side with an operation unit 11 having various buttons and a display unit 12 configured by a liquid crystal display, for example. The operation unit 11 includes a start button 11A for starting a reading operation and an electric power supply switch 11B.

2. Configuration of Reading Driving Unit

In the below, the reading driving unit 60 will be described with reference to FIGS. 3 to 5. The reading driving unit 60 includes a motor driving unit 61, a motor 62, a gear unit 70, a prevention mechanism 75 and a regulation member 76.

The motor 62 is a stepping motor, and the motor driving unit 61 is configured to generate a driving signal for stepwise driving the motor 62 under control of the CPU 20. The gear unit 70 includes a motor-side transmission gear 71, a carriage-side transmission gear 72, a feeding unit-side transmission gear 73 and a planet gear mechanism 74. The planet gear mechanism 74 includes a transmission gear 74A, a sun gear 74B and a planet gear 74C.

The motor-side transmission gear 71 is coupled with a rotary shaft of the motor 62 and meshed with the transmission gear 74A of the planet gear mechanism 74. Therefore, as the motor 62 is rotated, the motor-side transmission gear 71 is configured to transmit power, which is fed by the motor 62, to the transmission gear 74A. The sun gear 74B and the transmission gear 74A are coaxially fixed. As the transmission gear 74A is rotated, e.g., as the motor-side transmission gear 71 is rotated, the sun gear 74B is rotated.

The planet gear 74C is meshed with the sun gear 74B. As the sun gear 74B is rotated, the planet gear 74C rotates on its own axis and revolves around the sun gear. A position of the planet gear 74C is switched between a carriage-side position (hereinafter, referred to as 'FB-side position'), at which the planet gear 74C is meshed with the carriage-side transmission gear 72 to thus couple the motor-side transmission gear 71 and the carriage-side transmission gear 72 via the transmission gear 74A and the sun gear 74B, and a feeding unit-side position (hereinafter, referred to as 'ADF-side position'), at which the planet gear 74C is meshed with the feeding unit-side transmission gear 73 to thus couple the motor-side transmission gear 71 and the feeding unit-side transmission gear 73 via the transmission gear 74A and the sun gear 74B. FIG. 3 shows a state where the planet gear 74C is located at the FB-side position, and FIG. 4 shows a state where the planet gear 74C is located at the ADF-side position.

Figure 3:
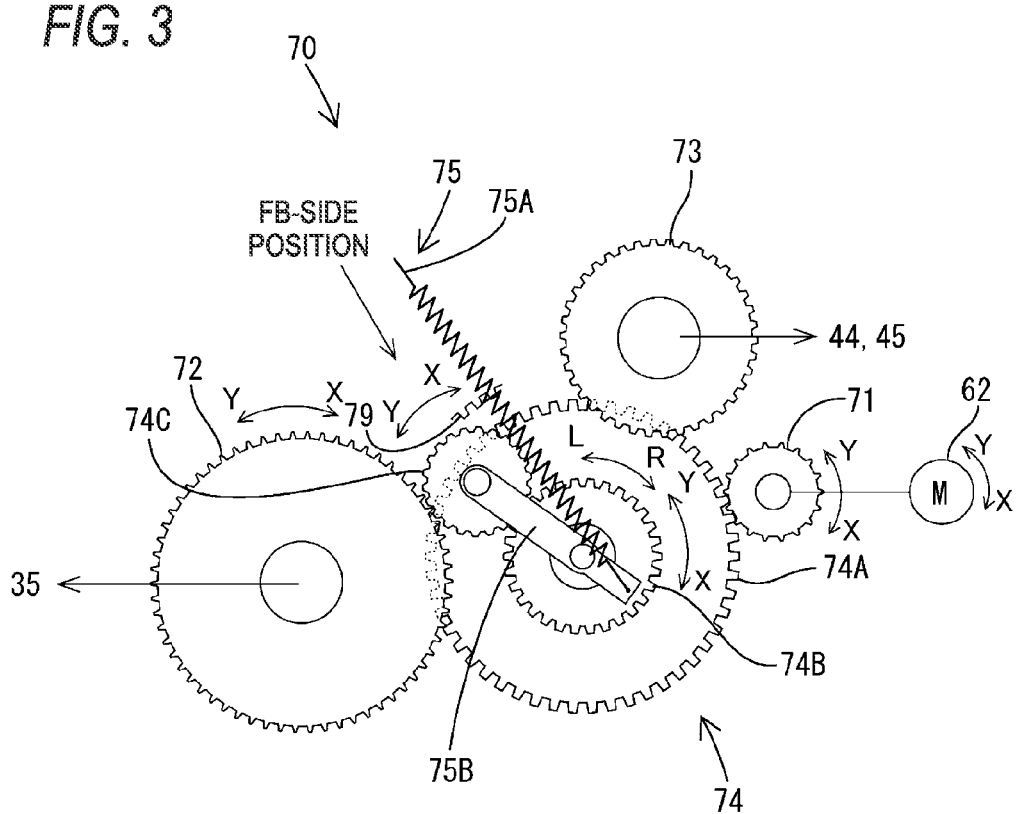
FIG. 3 illustrates a case where a planet gear is located at a carriage-side position.

Incidentally, when executing the moving reading at the FB-side position, the planet gear 74C is prevented from revolving around the sun gear by the prevention mechanism 75 and rotates on its own axis with being held at the FB-side position as the sun gear 74B is rotated, as shown in FIG. 3. Also, when the position of the planet gear 74C is switched, the planet gear 74C revolves around the sun gear as the sun gear 74B is rotated, because a higher force than the force of preventing the revolution by the prevention mechanism 75 is transmitted from the motor 62.

As shown in FIG. 3, the prevention mechanism 75 includes a spring 75A and a support member 75B, for example. One end of the spring 75A is fixed to the support member 75B, and the other end of the spring 75A is fixed to a frame unit (not shown) of the reading image apparatus 3, for example. The spring 75A is fixed with being stretched. Thereby, when the planet gear 74C is located at the FB-side position, a part of a contracting force of the spring 75A is applied to press the planet gear 74C toward the carriage-side transmission gear 72 through the support member 75B, so that the revolution of the planet gear 74C in an R direction is prevented. Also, when the planet gear 74C is located at the ADF-side position, as shown in FIG. 4, a part of the contracting force of the spring 75A is applied to press the planet gear 74C toward the feeding unit-side transmission gear 73 through the support member 75B, like the case where the planet gear 74C is located at the FB-side position, so that the revolution of the planet gear 74C in an L direction can be prevented.

As shown in FIG. 3, when the planet gear 74C is located at the FB-side position, e.g., when executing the moving reading mode, the carriage-side transmission gear 72 transmits the power from the motor 62 to the carriage 34 through the timing belt 35. Thereby, the carriage 34 is moved.

Figure 4:
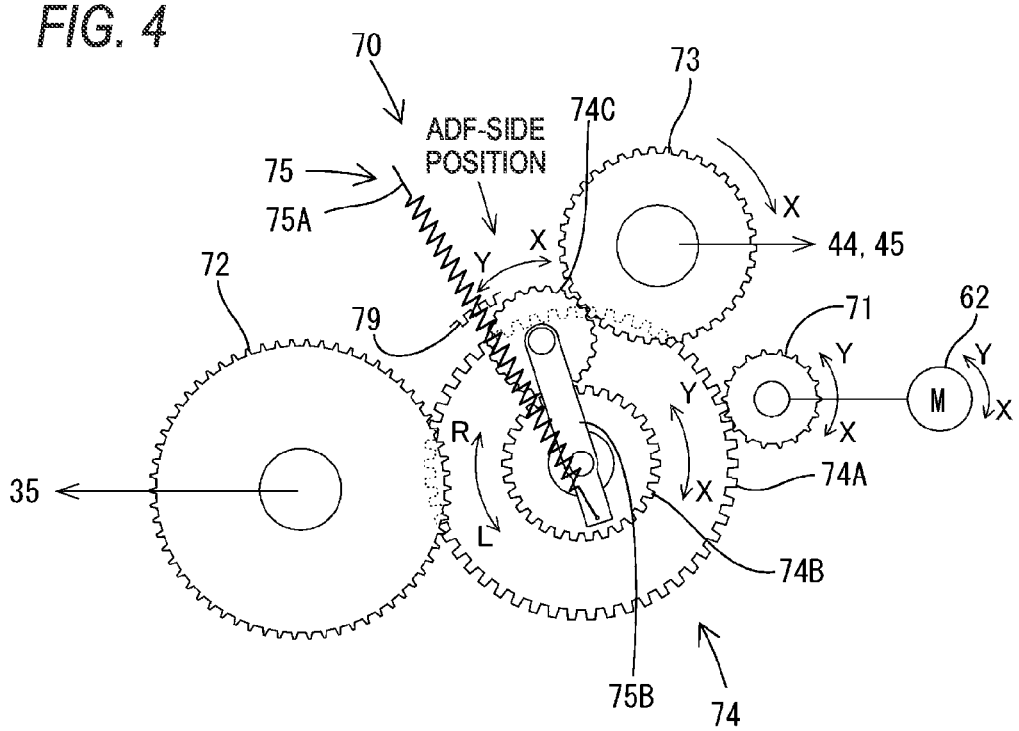
FIG. 4 illustrates a case where the planet gear is located at a feeding unit-side position.

As shown in FIG. 4, when the planet gear 74C is located at the ADF-side position, e.g., when executing the feeding reading mode, the feeding unit-side transmission gear 73 transmits the power from the motor 62 to the feeding rollers 44 and the sheet discharge rollers 45 through a predetermined gear mechanism (not shown) and the like. Thereby, the document 5 is fed.

The regulation member 76 is configured to regulate the moving of the carriage 34 when the linear image sensor 33 is moved to a position facing the second platen glass 53, e.g., when the carriage 34 is moved to the feeding reading position RP. The regulation member 76 is configured to fix the carriage 34 at the feeding reading position RP (e.g., the regulation member 76 is configured to regulate the moving of the carriage 34 from the feeding reading position RP) when the carriage 34 is moved from the document reading position at the moving reading mode in the arrow B direction (feeding reading position direction) of FIG. 2, which is a direction toward the feeding reading position RP, and reaches the feeding reading position RP as the motor is rotated in a Y direction (which is an example of the first rotating direction). Thereby, the carriage 34 is fixed at the feeding reading position RP at the feeding reading mode, so that the moving of the carriage 34 is regulated.

As shown in FIG. 2, for example, the regulation member 76 is made of an elastic member (for example, coil spring) configured to urge the carriage 34 in the direction of the platen glasses 52, 53 (the direction perpendicular to the A and B directions) when the carriage 34 moved in the B direction reaches the feeding reading position RP. A sensor may detect that the carriage 34 moved in the B direction reaches the feeding reading position RP, and when it is detected that the carriage 34 reaches the feeding reading position RP, the carriage 34 may be pressed toward the direction of the platen glasses 52, 53 by a pressing plate. When the carriage 34 is moved in the B direction, the pressing state that is made by the pressing plate may be released.

In the below, the operations of the reading driving unit 60 will be more specifically described. Incidentally, in FIGS. 3 and 4, a rotating direction of the X direction is referred to as a rotating direction of a clockwise direction, and a rotating direction of the Y direction is referred to as a rotating direction of a counterclockwise direction. Further, the rotation of the motor 62 in the X direction (which is an example of the second rotating direction) is referred to as a positive rotation, and the rotation thereof in the Y direction (which is an example of the first rotating direction) is referred to as an inverse rotation. Further, it is assumed that the motor-side transmission gear 71 is rotated in the X direction as the motor 62 is rotated in the X direction, and the motor-side transmission gear 71 is rotated in the Y direction as the motor 62 is rotated in the Y direction. That is, the motor-side transmission gear 71 is rotated in the same direction as the motor 62.

2-1. Rotation of Motor and Rotations of Respective Gears

For example, at a position at which the planet gear 74C is not meshed with not only the carriage-side transmission gear 72 but also the feeding unit-side transmission gear 73, when the motor 62 is rotated in the X direction, the motor-side transmission gear 71 is rotated in the X direction, so that the transmission gear 74A and the sun gear 74B are rotated in the Y direction. As the sun gear 74B is rotated in the Y direction, the planet gear 74C rotates on its own axis in the X direction and revolves around the sun gear in the L direction. Then, as shown in FIG. 3, when the planet gear 74C is meshed with the carriage-side transmission gear 72 and reaches the FB-side position, the planet gear 74C rotates on its own axis in the X direction but is prevented from revolving around the sun gear in the L direction by the carriage-side transmission gear 72. At this time, the regulation of the carriage 34 by the regulation member 76 is released. Also, the carriage-side transmission gear 72 is rotated in the Y direction, so that the timing belt 35 is moved in the A direction of FIG. 2, e.g., a direction of moving the carriage 34 from the reading starting position PS to the reading ending position PE.

On the other hand, when the motor 62 is rotated in the Y direction at a state where the carriage 34 is located at a position other than the feeding reading position RP, the motor-side transmission gear 71 is rotated in the Y direction, so that the transmission gear 74A and the sun gear 74B are rotated in the X direction. As the sun gear 74B is rotated in the X direction, the planet gear 74C rotates on its own axis in the Y direction but is prevented from revolving around the sun gear in the R direction by the prevention mechanism 75. At this time, the carriage-side transmission gear 72 is rotated in the X direction, so that the timing belt 35 is moved in the B direction of FIG. 2, e.g., a direction of moving the carriage 34 from the reading ending position PE to the reading starting position PS.

When the carriage 34 moved in the B direction of FIG. 2 reaches the feeding reading position RP, the moving of the carriage 34 is regulated by the regulation member 76. Also, the planet gear 74C starts the revolution with the higher force than the force of preventing the revolution in the R direction by the prevention mechanism 75, so that the planet gear 74C revolves around the sun gear in the R direction while rotating on its own axis in the Y direction. Then, as shown in FIG. 4, when the planet gear 74C is meshed with the feeding unit-side transmission gear 73 to thus reach the ADF-side position, the planet gear 74C rotates on its own axis in the Y direction but is prevented from revolving around the sun gear in the R direction by the feeding unit-side transmission gear 73. At this time, as the planet gear 74C rotates on its own axis in the Y direction, the feeding unit-side transmission gear 73 is rotated in the X direction. As the feeding unit-side transmission gear 73 is rotated in the X direction, the feeding rollers 44 and the sheet discharge rollers 45 are rotated.

On the other hand, when the motor 62 is rotated in the X direction, the motor-side transmission gear 71 is rotated in the X direction, so that the transmission gear 74A and the sun gear 74B are rotated in the Y direction. As the sun gear 74B is rotated in the Y direction, the revolution-prevented state of the planet gear 74C in the R direction is released, so that the planet gear 74C revolves around the sun gear in the L direction along a path 79 (which will be described later) while rotating on its own axis in the X direction.

Incidentally, in this exemplary embodiment, the rotating direction of the motor 62 in the X direction corresponds to the second rotating direction, and the rotating direction of the motor 62 in the Y direction corresponds to the first rotating direction. However, the invention is not limited thereto. For example, the rotating direction of the motor 62 in the X direction may be the first rotating direction, and the rotating direction of the motor 62 in the Y direction may be the second rotating direction.

2-2. Operations of Respective Gears relating to Feeding Reading Mode

At the feeding reading mode, in the case that the motor 62 is rotated in the Y direction so that the planet gear 74C rotates on its own axis in the Y direction and revolves around the sun gear in the R direction along which the planet gear 74C is meshed with the feeding unit-side transmission gear 73, when the motor 62 is continuously rotated in the Y direction even after the planet gear 74C is meshed with the feeding unit-side transmission gear 73, the feeding rollers 44 and the sheet discharge rollers 45 are rotated in the direction of feeding the document 5 from the document tray 42 to the sheet discharge tray 46.

Further, when the motor 62 is rotated in the X direction after the planet gear 74C is meshed with the feeding unit-side transmission gear 73, the planet gear 74C rotates on its own axis in the X direction and revolves around the sun gear in the L direction along which the planet gear 74C gets away from the meshed feeding unit-side transmission gear 73. Incidentally, the feeding unit-side transmission gear 73 rotates only in the X direction.

2-3. Operations of Respective Gears Relating to Moving Reading Mode

At the moving reading mode, in the case that the motor 62 is rotated in the X direction so that the planet gear 74C rotates on its own axis in the X direction and revolves around the sun gear in the L direction along which it is meshed with the carriage-side transmission gear 72, when the motor 62 is continuously rotated in the X direction even after the planet gear 74C is meshed with the carriage-side transmission gear 72, the carriage-side transmission gear 72 is driven in the Y direction so that the timing belt 35 moves the carriage 34 in the A direction of FIG. 2.

Further, when the motor 62 is inversely rotated in the Y direction from the X direction after the planet gear 74C is meshed with the carriage-side transmission gear 72, the planet gear 74C rotates on its own axis in the Y direction. However, the planet gear 74C rotates on its own axis in the Y direction without revolving around the sun gear in the R direction by the prevention mechanism 75 that prevents the planet gear 74C from revolving around the sun gear in the R direction along which the planet gear 74C gets away from the meshed carriage-side transmission gear 72. At this time, the carriage-side transmission gear 72 is inversely rotated in the X direction, so that the timing belt 35 is driven in the direction of moving the carriage 34 in the B direction of FIG. 2.

When the timing belt 35 is driven in the direction of moving the carriage 34 in the B direction of FIG. 2 and thus the carriage 34 reaches a position at which the carriage 34 is unable to physically move, e.g., the feeding reading position RP in this exemplary embodiment, the carriage-side transmission gear 72 is stopped and the planet gear 74C kicks the stopped carriage-side transmission gear 72. Here, the path 79 having internal teeth is provided along which the planet gear 74C moves from the carriage-side transmission gear 72 to the feeding unit-side transmission gear 73. Therefore, the planet gear 74C starts to revolve around the sun gear in the R direction with being meshed with the internal teeth of the path 79. Since the planet gear 74C revolves around the sun gear with the higher force than the force of pressing the planet gear 74C toward the carriage-side transmission gear 72, the planet gear 74C is able to reach the feeding unit-side transmission gear 73, so that the operations of the respective gears relating to the feeding reading mode start.

3. Electrical Configuration of Multi-Function Device

Figure 5:
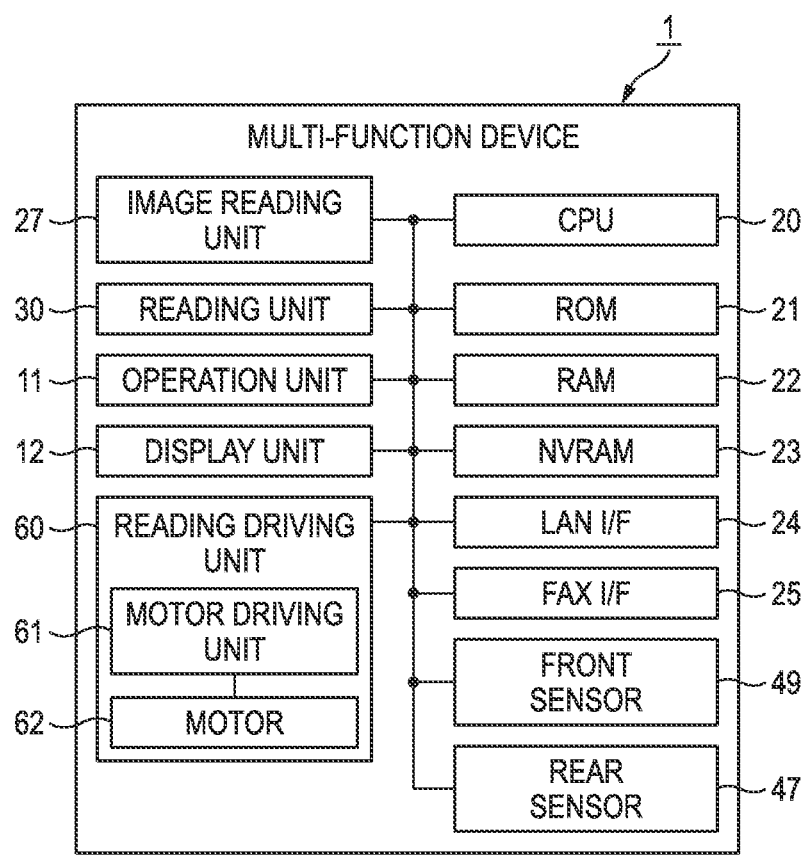
FIG. 5 is a block diagram schematically showing an electrical configuration of the multi-function device.

As shown in FIG. 5, the multi-function device 1 includes a CPU 20 (which is an example of a control device), a ROM 21, a RAM 22, an NVRAM (non-volatile memory) 23, a network interface (which is an example of the reception unit) 24 and a facsimile interface 25. An image forming unit 27, the reading unit 30, the operation unit 11, the display unit 12, the rear sensor 47, the front sensor 49, the reading driving unit 60 and the like are connected thereto.

The ROM 21 is configured to store a variety of programs for controlling operations of the multi-function device 1. The CPU 20 is configured to store a processing result in the RAM 22 or NVRAM 23 and to control the respective units in response to the program read from the ROM 21.

The network interface 24 is connected to an external computer and the like via a communication line (not shown). Data communication can be performed through the network interface 24. Incidentally, it is also possible to receive a reading starting instruction from the external computer through the network interface 24.

The facsimile interface 25 is connected to a telephone line (not shown). Facsimile data communication with an external facsimile apparatus and the like can be performed through the facsimile interface 25. The image forming unit 27 includes a charging unit, an exposure unit, a photosensitive member, a developing unit, a transfer unit and a fixing unit, which are well-known, and is configured to form an image on a sheet (which is an example of recording medium), based on image data of an image (document) read by the image reading apparatus 3.

The CPU 20 is configured to control the respective process relating to the multi-function device 1. The CPU 20 is configured to perform a planet gear switching process that will be described later, as the process relating to the multi-function device 1. In an initialization process of the reading unit 30 of the planet gear switching process, the CPU 20 is configured to detect the home position HP by using the mark 55 for home position HP detection, generate white reference data and perform white correction by using the white reference data.

In the configuration of the image reading apparatus 3, when the CPU 20 rotates the motor 62 in the Y direction so as to move the carriage 34 in the moving direction B of FIG. 2, the carriage 34 moves, as a maximum moving distance Dmax, from the reading ending position PE at which the reading of the document is over to a switching position, at which the planet gear 74C is switched from the FB-side position to the ADF-side position, via the reading starting position PS, at which the reading of the document starts (refer to FIG. 2). In this exemplary embodiment, the switching position is the feeding reading position. Incidentally, the switching position is not limited thereto. A driving step count value of the motor 62 capable of moving the carriage 34 by the maximum moving distance Dmax corresponds to the 'second driving amount corresponding to a maximum moving distance with which the carriage can be moved in the feeding reading direction.'

Further, as described above, the moving of the carriage 34 is regulated by the regulation member 76 when the carriage reaches the feeding reading position RP. After the moving of the carriage 34 is regulated by the regulation member 76, the planet gear 74C starts to switch from the FB-side position to the ADF-side position, and the feeding units 44, 45 are rotated in the direction of feeding the document 5 when the planet gear 74C is located at the ADF-side position.

4. Planet Gear Switching Process

Subsequently, the planet gear switching process of this exemplary embodiment will be described. When the CPU 20 starts to supply the electric power to the respective units of the image reading apparatus 3, e.g., when the electric power is supplied to the image reading apparatus 3, the planet gear switching process is performed. At this time, respective process relating to the planet gear switching process is performed by the CPU 20 in response to a predetermined control program stored in the ROM 21 and the like. Incidentally, in this exemplary embodiment, when the electric power supply switch 11B of the multi-function device 1 becomes on, the CPU 20 starts to supply the electric power to the respective units of the multi-function device 1.

In the planet gear switching process, when starting to drive the motor 62 for the initialization process, the CPU 20 is configured to perform: a first switching process for enabling the planet gear 74C to be meshed with the feeding unit-side transmission gear 73; a second switching process for switching a position of the planet gear 74C to the carriage-side position after the first switching process; and the initialization process after performing the second switching process.

Figure 6:
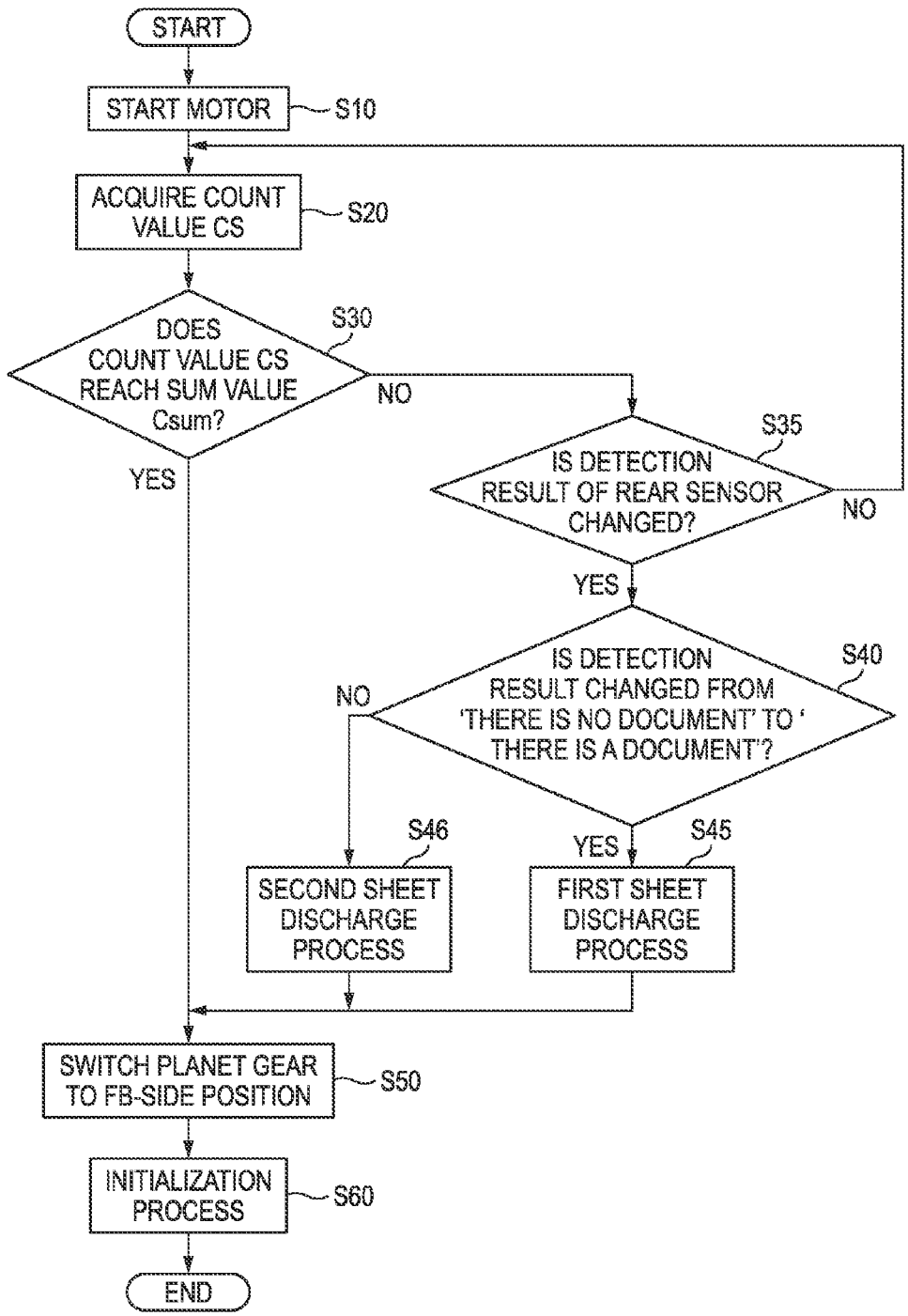
FIG. 6 is a flowchart showing a planet gear switching process.

In the planet gear switching process, as shown in FIG. 6, the CPU 20 supplies a motor control signal for stepwise rotating the motor 62 in the Y direction (which is an example of the first rotating direction) to the motor driving unit 61 to thereby start the motor 62 and starts to count the number of driving steps of the motor 62, based on the motor control signal, for example (step S10). Then, the CPU 20 acquires a count value CS of the number of driving steps (step S20).

Subsequently, the CPU 20 determines whether the count value CS reaches a sum value Csum (Csum=CK+CM) of a switching count value CK and a count value CM. Here, the switching count value CK is necessary to switch the planet gear 74C from the FB-side position at which the planet gear 74C and the carriage-side transmission gear 72 are meshed with each other to the ADF-side position at which the planet gear 74C and the feeding unit-side transmission gear 73 are meshed with each other. The count value CM corresponding to the maximum moving distance Dmax (step S30: driving amount determining process).

When it is determined that the count value CS reaches the sum value Csum (step S30: YES), the CPU 20 determines that the planet gear 74C is switched to the ADF-side position. Then, the CPU 20 continues to rotate the motor 62 in the X direction and switches the planet gear 74C to the FB-side position (step S50: second switching process). The reason is as follows.

That is, in the case that the planet gear 74C is located at the FB-side position upon the starting of the motor 62, when the count value CS reaches the sum value Csum, it can be determined that the carriage 34 reaches the feeding reading position RP and also the planet gear 74C is switched to the ADF-side position, by the above configuration of this exemplary embodiment. In the meantime, even when the planet gear 74C is already located at the ADF-side position upon the starting of the motor 62, as the count value CS reaches the sum value Csum, it can be positively determined that the planet gear 74C is located at the ADF-side position. This is effective as a method of determining that the planet gear 74C is located at the ADF-side position when the document 5 is not set on the document tray 42.

On the other hand, when it is determined in step S30 that the count value CS does not reach the sum value Csum (step S30: NO), the CPU 20 determines whether a detection result of the rear sensor 47 is changed, based on a detection signal from the rear sensor 47 (step S35). This determination process is an example of the document determining process. For example, the determination process is a process of determining whether the document 5 remains in the feeding unit, when the electric power supply of the multi-function device 1 becomes off during the feeding reading mode.

When it is determined that a detection result of the rear sensor 47 is changed (step S35: YES), the CPU 20 determines whether the detection result of the rear sensor 47 is changed from a result that there is no document 5 to a result that there is the document 5 (step S40). On the other hand, when it is determined that a detection result of the rear sensor 47 is not changed (step S35: NO), the CPU 20 determines that the planet gear 74C is located at the ADF-side position but there is no document 5 remaining in the feeding unit or that the planet gear 74C is not located at the ADF-side position and returns to the process of step S20. Here, the process of steps S10, S20, S30 and S35 is an example of the first switching process.

When it is determined that the detection result of the rear sensor 47 is changed from a result that there is no document 5 to a result that there is the document 5 (step S40: YES), it can be determined that the planet gear 74C is currently located at the ADF-side position because the document 5 set on the document tray 42 got sucked in the feeding path when disconnecting the electric power supply, for example. Therefore, the motor 62 is rotated in the Y direction by the number of steps necessary to discharge all the documents 5 set on the document tray 42, so that all the documents 5 set on the document tray 42 are discharged to the sheet discharge tray 46 (step S45: first sheet discharge process).

Incidentally, the number of steps necessary to discharge all the documents 5 is different depending on the number of the documents 5. Therefore, the motor 52 is rotated in the Y direction at least after a final document is not detected by the front sensor 49 and a rear end of the final document is detected by the rear sensor 47 until the driving of the predetermined number of steps necessary to discharge the documents is over. Like this, after all the documents 5 on the document tray 42 are discharged onto the sheet discharge tray 46 and there is thus no document 5 remaining in the feeding path 43, the CPU 20 rotates the motor 62 in the X direction to thus switch the planet gear 74C to the FB-side position (step S50).

On the other hand, when it is determined that the detection result of the rear sensor 47 is not changed from a result that there is no document 5 to a result that there is the document 5, e.g., when it is determined that the detection result of the rear sensor 47 is changed from a result that there is the document 5 to a result that there is no document 5 (step S40: NO), it can be determined that, since the document 5 remains in the feeding unit due to the disconnection of the electric power supply and is fed in the feeding path 43, the planet gear 74C is currently located at the ADF-side position. Therefore, the motor 62 is rotated in the Y direction by the predetermined number of steps necessary to discharge the document 5 in the feeding path 43, so that the document 5 in the feeding path 43 is discharged to the sheet discharge tray 46 (step S46: second sheet discharge process). Here, it is assumed that the predetermined number of steps is determined in advance. The predetermined number of steps may be the predetermined number of steps after the rear sensor 47 detects the leading end of the document 5, for example, or the predetermined number of steps after the document 5 is slightly fed and the rear sensor 47 detects a rear end of the document 5.

After that, the CPU 20 rotates the motor 62 in the X direction to thus switch the planet gear 74C to the FB-side position (step S50). Like this, even when the count value CS does not reach the sum value Csum, it is possible to determine that the planet gear 74C is located at the ADF-side position upon the starting of the motor 62, from the detection result of the rear sensor 47. Further, it is possible to discharge the document 5 that remains in the feeding unit due to the disconnection of the electric power supply.

Incidentally, the process of steps S35, S40, S45 and S46 may be omitted. In this case, when it is determined in step S30 that the count value CS does not reach the sum value Csum (step S30: NO), the CPU 20 stands by until the count value CS reaches the sum value Csum.

After switching the planet gear 74C to the FB-side position, like the process of step S50, the CPU 20 initializes the reading unit 30 (step S60: initialization process). In the initialization process of the reading unit 30, the CPU 20 drives the motor 62 in the same direction (e.g., the X direction) as the motor driving direction in step S50 (which is an example of the second switching process), thereby moving the carriage 34 from the feeding reading position RP toward the home position HP (refer to the arrow A direction in FIG. 2). Then, the CPU 20 controls the reading unit 30 to read the mark 55 for home position detection, thereby detecting the home position HP (which is an example of the home position detection process).

Incidentally, in this exemplary embodiment, the planet gear switching process is performed when the electric power is supplied to the image reading apparatus 3. However, the invention is not limited thereto. For example, the planet gear switching process may be performed upon return from an electric power saving state or after a jam process in the ADF device 40 that will be described below.

5. Advantages of First Exemplary Embodiment

According to this exemplary embodiment, the planet gear 74C is switched between the carriage-side position, at which the motor-side transmission gear 71 and the carriage-side transmission gear 72 are coupled, and the feeding unit-side position, at which the motor-side transmission gear 71 and the feeding unit-side transmission gear 73 are coupled. At this time, the planet gear 74C is meshed with the carriage-side transmission gear 72 or feeding unit-side transmission gear 73 at the state where the carriage 34 is located at the feeding reading position RP that is the document reading position at the feeding reading mode. In the planet gear switching process, when starting the driving of the motor 62 for initializing the reading unit 30, the CPU 20 performs the first switching process (steps S10 to S35) for enabling the planet gear 74C to mesh with the feeding unit-side transmission gear 73 and then switches the planet gear 74C to the carriage-side position (the second switching process). Then, after switching the planet gear 74C to the carriage-side position, the CPU performs the initialization process. Therefore, even when the reading operation is not normally ended and the position of the carriage 34 is thus unclear, the carriage 34 is surely located at the feeding reading position RP upon processing the initialization process.

Accordingly, the control unit can appropriately move the carriage from the feeding reading position RP to the home position HP (which is an example of the predetermined position) for the initialization process. Thereby, it is possible to securely perform the initialization process of the reading unit 30.

Further, when starting to supply the electric power to the respective units of the image reading apparatus 3, the CPU 20 performs the planet gear switching process. Thus, upon the starting of supplying the electric power, it is possible to securely perform the initialization process of the reading unit 30 at the state where the planet gear 74C is located at the FB-side position.

Second Exemplary Embodiment

Figure 7:
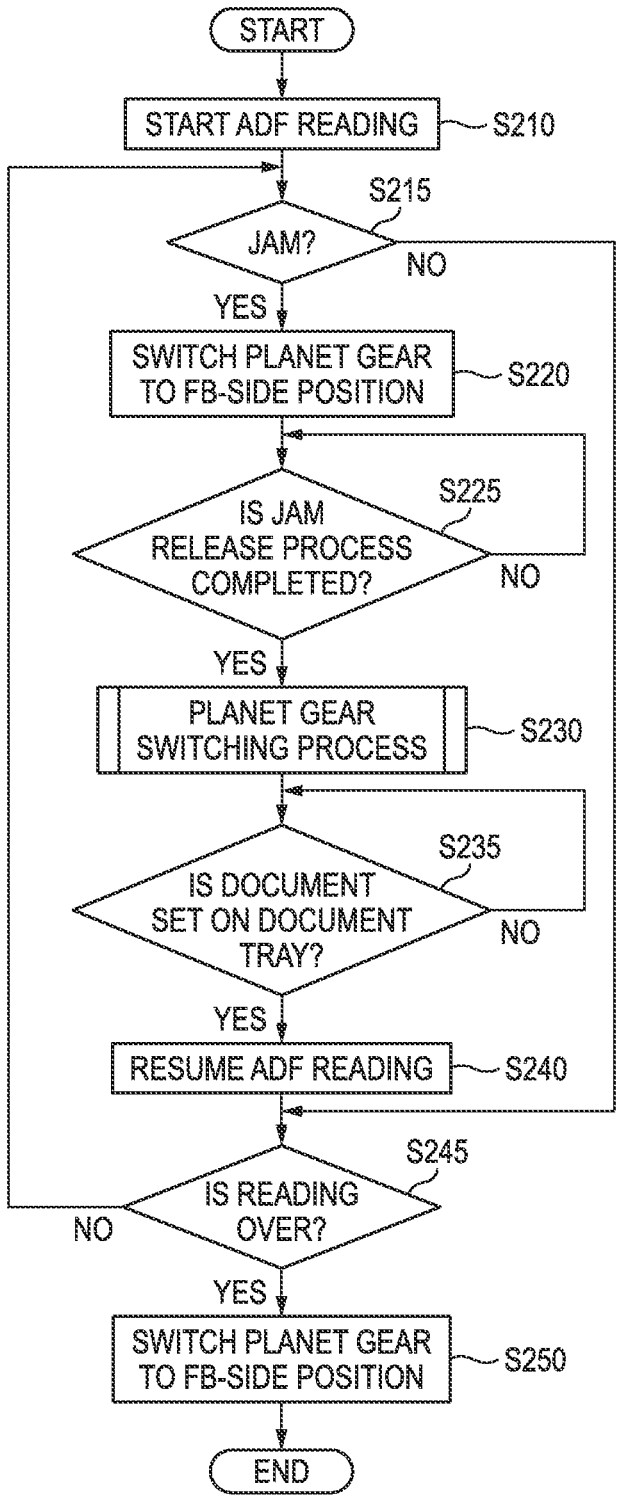
FIG. 7 is a flowchart showing a reading process at a feeding reading mode of a second exemplary embodiment.

In the below, a second exemplary embodiment will be described with reference to FIG. 7. In the second exemplary embodiment, an example where the planet gear switching process is performed at the feeding reading mode after a jam process in the ADF device 40 is described. The process shown in FIG. 7 is performed by the CPU 20 in response to a predetermined program stored in the ROM 21 and the like. Incidentally, the same members as those of the first exemplary embodiment are denoted with the same reference numerals and the descriptions thereof are omitted.

Upon receiving an instruction for an ADF reading from a user, for example, the CPU 20 rotates the motor 62 in the Y direction to thus drive the feeding unit-side transmission gear 73 through the planet gear 74C, thereby starting a reading operation at the feeding reading mode (step S210). Then, the CPU 20 determines whether a jam (document jam) occurs during the ADF reading (step S215). The determination of an occurrence of the jam is determined depending on whether a predetermined time period has elapsed after the feeding of the document 5 from the document tray 42 starts until the document is detected by the rear sensor 47, for example.

When it is determined that the jam occurs (step S215: YES), the CPU rotates the motor 62 in the X direction by the predetermined number of steps to thus switch the planet gear 74C to the FB-side position (step S220). At this time, preferably, the CPU 20 rotates the motor 62 by the sufficient number of steps at least until the planet gear 74C is meshed with the carriage-side transmission gear 72. Incidentally, when performing an operation of releasing the jam, it is not necessarily required to rotate the motor 62 until the planet gear 74C is meshed with the carriage-side transmission gear 72. Therefore, the number of driving steps of the motor 62 for jam release is typically arbitrary and the position of the carriage 34 is not specified upon processing the process of step S220.

Subsequently, the CPU 20 determines whether the jam release process is completed (step S225). The determination of a completion of the jam release process is determined depending on whether the CPU 20 displays receives a reply (signal), which indicates that the jammed document has been removed, from the user after displaying a message, which indicates whether a jammed document is removed, on the display unit 12.

When it is determined that the jam release process is completed (step S225: YES), the CPU 20 performs the planet gear switching process shown in FIG. 6 of the first exemplary embodiment (S230). Incidentally, when performing the planet gear switching process, the process of steps S35, S40, S45 and S46 of FIG. 6 may be omitted. The reason is as follows: when the jamming state is released, there is little a possibility that the document 5 will remain in the feeding path 43.

Subsequently, the CPU 20 determines whether there is the document 5 on the document tray 46 (step S235). Regarding this determination, a message indicating whether or not to continuously read a document after the jammed state is released is displayed on the display unit 12. Then, the determination of an existence of the document 5 on the document tray 46 is determined depending on whether the CPU 20 receives a document detection signal from the front sensor 49.

When it is determined that the document 5 is set on the document tray 46 (step S235: YES), the CPU 20 controls the motor 62 to rotate in the Y direction to resume the reading at the feeding reading mode (step S240). Then, the CPU 20 repeats the process of steps S215 to S240 until all the documents 5 are read.

When all the documents 5 are read (step S245: YES), the CPU 20 controls the motor 62 to rotate in the X direction to thus switch the planet gear 74C from the ADF-side position to the FB-side position (step S250), thereby completing the ADF reading process.

6. Advantages of Second Exemplary Embodiment

When the jam occurs at the feeding reading mode and the motor 62 is driven to release the meshed state of the planet gear 74C and the feeding unit-side transmission gear 73 so as to release the jammed state, the planet gear switching process shown in FIG. 6 is performed. Therefore, even though the position of the carriage 34 is unclear due to the motor driving for the jam release, the carriage 34 is located at the feeding reading position RP by the 'planet gear switching process' when performing the initialization process of the reading unit 30 after the jammed state is released. Therefore, it is possible to appropriately move the carriage 34 to the predetermined position, for example home position HP.

Modifications to Exemplary Embodiments

The invention is not limited to the exemplary embodiments that have been described with reference to the above technology and drawings. For example, following exemplary embodiments are also within the technical scope of the invention.

(1) In the first exemplary embodiment, the process of steps S20 and S30 may be omitted. That is, the process after step S35 and thereafter may be performed following step S10. Also in this case, it is possible to perform the determination relating to the meshing of the planet gear 74C and the feeding unit-side transmission gear 73 by determining whether the detection result of the rear sensor 47 (document detection unit) is changed. After the determination, the planet gear 74C may be meshed with the carriage-side transmission gear 72. That is, when the detection result of the rear sensor 47 is changed, the possibility that the planet gear 74C will be located at the ADF-side position is high. Hence, it is possible to securely determine that the planet gear 74C is located at the ADF-side position, upon the starting of the motor.

(2) To the contrary, in the first exemplary embodiment, the process of steps S35, S40 and S45 may be omitted. Also in this case, after securely switching the planet gear 74C to the ADF-side position, based on the count value CS, it is possible to switch the planet gear 74C from the ADF-side position to the FB-side position.

(3) As the determination process in the switching process, the CPU 20 may perform a process of determining whether the front sensor (setting detection unit) 49 detects that there is the document 5 and the rear sensor 47 (downstream-side detection unit) detects that there is no document 5. In this determination process, the CPU 20 may not switch the planet gear 74C to the ADF-side position when the front sensor 49 detects that there is the document 5 and the rear sensor 47 detects that there is no document 5.

In this case, upon the starting of supplying the electric power, when the planet gear 74C is switched to the ADF-side position at the state where the document 5 is set on the document tray 42, the document 5 may get sucked in the feeding unit 43 and may be thus damaged. Therefore, by configuring not switch the position of the planet gear 74C to the ADF-side position when the document 5 is set on the document tray 42, it is possible to suppress the damage to the document 5.

(4) In the above-described exemplary embodiments, the CPU 20 may switch the planet gear 74C from the ADF-side position to the FB-side position after the document reading mode using the feeding units 44, 45, e.g., the feeding reading mode is over. In this case, when a next reading is the moving reading mode of moving the carriage 34 to thus read the document, it is possible to shorten the time that is consumed to prepare the next reading.

(5) In the above-described exemplary embodiments, the planet gear 74C of the planet gear mechanism 74 is used as the switching gear. However, the invention is not limited thereto. For example, another well-known configuration that is switched between the carriage-side position (FB-side position) coupling the motor-side transmission gear 71 and the carriage-side transmission gear 72 and the feeding unit-side position (ADF-side position) coupling the motor-side transmission gear 71 and the feeding unit-side transmission gear 73 may be used as the switching gear.

(6) In the above-described exemplary embodiments, the invention is applied when the CPU 20 starts to supply the electric power to the respective units of the multi-function device 1. However, the invention is not limited thereto. For example, regarding a multi-function device having a configuration capable of individually supplying the electric power to the image reading apparatus 3, the image forming unit 27 and the like, the invention may be applied only when the electric power is supplied to the image reading apparatus 3.

(7) In the above-described exemplary embodiments, in the initialization process, the CPU 20 drives the motor 62 in the same direction (X direction) as the direction of driving the motor 62 in the second switching process to thus move the carriage 34 from the feeding reading position RP toward the home position HP (A direction) and to thus enable the reading unit 30 to read the mark (detection member) 55 for home position detection, thereby detecting the home position HP. However, the invention is not limited thereto. For example, the CPU 20 may drive the motor 62 in an opposite direction (Y direction) to the direction of driving the motor 62 in the second switching process, thereby detecting the home position HP. Alternatively, the CPU 20 may drive the motor 62 in the Y direction after driving the motor 62 in the X direction by the predetermined number of steps, thereby detecting the home position HP.

As discussed above, the invention can provide at lest following illustrative, non-limiting embodiments.

(1) An image reading apparatus comprising: a reading unit configured to read an image of a document; a feeding unit configured to feed the document; a carriage configured to hold the reading unit and move the reading unit in a predetermined direction; a motor; a motor-side transmission gear configured to transmit power supplied from the motor; a carriage-side transmission gear configured to transmit the power to the carriage when executing a moving reading of moving the carriage to read the image of the document; a feeding unit-side transmission gear configured to transmit the power to the feeding unit when executing a feeding reading of reading the image of the document that is fed by the feeding unit; a switching gear; and a control device. The switching gear is configured to: mesh with the carriage-side transmission gear at a carriage-side position, in which the motor-side transmission gear and the carriage-side transmission gear are coupled at a state where the carriage is located at a feeding reading position that is a document reading position, when executing the feeding reading: and mesh with the feeding unit-side transmission gear at a feeding unit-side position, in which the motor-side transmission gear and the feeding unit-side transmission gear are coupled, when executing the moving reading, wherein the switching gear is configured to switch between a meshing state with the carriage-side transmission gear and a meshing state with the feeding unit-side transmission gear. The control device is configured to perform: a first switching process for meshing the switching gear with the feeding unit-side transmission gear before performing an initialization process of the reading unit; a second switching process for meshing the switching with the carriage-side transmission gear after performing the first switching process; and the initialization process of the reading unit after performing the second switching process.

According to the above configuration, when starting to drive the motor for the initialization process of the reading unit, the control device performs the first switching process for enabling the switching gear to mesh with the feeding unit-side transmission gear, for example, enables the switching gear to mesh with the feeding unit-side transmission gear and then the switching gear is meshed with the carriage-side transmission gear. Therefore, even when a reading operation is not normally ended and a position of the carriage is thus unclear, the carriage is surely located at the feeding reading position upon performing the initialization process. Accordingly, the control device is able to appropriately move the carriage to a predetermined position for the initialization process.

Incidentally, as the case where the reading operation is not normally ended, a case may be assumed in which a power supply of the image reading apparatus is abruptly disconnected, so that the planet gear is located at a halfway position, which is neither the feeding unit-side position nor the carriage-side position. Alternatively, it may also be assumed a case where a jam (document jam) has occurred upon a reading using the feeding device and, in order to easily release the jammed state, the planet gear is temporarily released from the meshed state with the gear at the feeding unit-side position or the planet gear is temporarily meshed with the gear at the carriage-side position.

Also, the term 'the first switching process' includes the process for enabling the switching gear to mesh with the feeding unit-side transmission gear and also include a process of determining whether or not to enable the switching gear to mesh with the feeding unit-side transmission gear.

(2) The carriage is configured to be moved from the document reading position at the moving reading in a feeding reading position direction, which is a direction toward the feeding reading position, by a rotation of the motor in a first rotating direction. The image reading apparatus further comprises a regulation member configured to regulate the moving of the carriage from the feeding reading position when the carriage reaches the feeding reading position. The switching gear is configured to be meshed with the feeding unit-side transmission gear by the rotation of the motor in the first rotating direction at a state where the moving of the carriage from the feeding reading position is regulated by the regulation member. In the first switching process, the control device is configured to perform a driving amount determining process comprising: detecting a driving amount of the motor from a driving starting in the first rotating direction; and determining whether the driving amount reaches an addition driving amount that is obtained by adding a first driving amount, which is required when the switching gear is switched from the carriage-side position to the feeding unit-side position, and a second driving amount, which corresponds to a maximum moving distance with which the carriage is able to be moved in the feeding reading position direction. When it is determined that the driving amount reaches the addition driving amount, the control device is configured to drive the motor in a second rotating direction, which is opposite to the first rotating direction, to perform the second switching process.

According to the above configuration, after securely switching the switching gear to the feeding unit-side position, depending on a determination result of the driving amount, it is possible to switch the switching gear from the feeding unit-side position to the carriage-side position.

(3) The feeding unit comprises: a sheet feeding tray; a sheet discharge tray, onto which a document fed from the sheet feeding tray is discharged; and a feeding path, through which the document passes when the document is fed from the sheet feeding tray to the sheet discharge tray. The feeding unit is configured to feed the document from the sheet feeding tray to the sheet discharge tray. The image reading apparatus further comprises a document detection unit configured to detect whether a document is positioned in the feeding unit. When it is determined in the driving amount determining process that the driving amount of the motor does not reach the addition driving amount, the control device is configured to perform a document determining process of determining whether a detection result of the document detection unit is changed. When it is determined in the document determining process that a detection result of the document detection unit is changed, the control device is configured to: control the feeding unit to perform predetermined process; and perform the second switching process after the feeding unit performs the predetermined process.

When a detection result of the document detection unit is changed, a possibility that the document is fed in the feeding unit is high, because the position of the switching gear has been switched to the feeding unit-side position. Therefore, according to the above configuration, it is possible to securely determine that the position of the switching gear has been switched to the feeding unit-side position. Also, it is possible to know that the position of the switching gear has been switched to the feeding unit-side position before the driving amount reaches a sum of the driving amount, which is required when the switching gear is switched from the carriage-side position to the feeding unit-side position, and the maximum driving amount capable of moving the carriage in one direction. According thereto, it is possible to shorten the time that is consumed to switch the switching gear to the feeding unit-side position.

(4) The feeding unit comprises: a sheet feeding tray; a sheet discharge tray, onto which a document fed from the sheet feeding tray is discharged; and a feeding path, through which the document passes when the document is fed from the sheet feeding tray to the sheet discharge tray. The feeding unit is configured to feed the document from the sheet feeding tray to the sheet discharge tray. The image reading apparatus further comprises a document detection unit configured to detect whether a document is positioned in the feeding unit. In the first switching process, the control device is configured to perform a document determining process of determining whether a detection result of the document detection unit is changed as the motor is driven. When it is determined in the document determining process that a detection result of the document detection unit is changed, the control device is configured to: control the feeding unit to perform a predetermined process; and perform the second switching process after the feeding unit performs the predetermined process.

For example, when the detection result of the document detection unit is changed by the driving of the motor upon power fail recovery, the possibility that the document is fed in the feeding unit is high, because the switching gear is located at the feeding unit-side position. Hence, according to the above configuration, it is possible to securely determine that the switching gear is located at the feeding unit-side position upon the power fail recovery, for example. Therefore, it is possible to perform the predetermined process for the document in the feeding unit, for example, the sheet discharge process and then to perform the second switching process.

(5) When a detection result of the document detection unit is changed from a result that there is no document to a result that there is a document, the control device is configured to drive the feeding unit to perform a discharge process of discharging the document in the feeding unit onto the sheet discharge tray as the predetermined process. The control device is configured to perform the second switching process after the feeding unit performs the discharge process.

According to the above configuration, when switching the switching gear to the feeding unit-side position, even though the document has been fed in the feeding path, it is possible to switch the switching gear to the carriage-side position at a state where the document has been discharged to an outside of the feeding path. Hence, it is possible to switch the switching gear to the carriage-side position without interrupting the operation of switching the switching gear to the carriage-side position even when a document jam occurs in the feeding device.

(6) The feeding unit comprises: a sheet feeding tray; a sheet discharge tray, onto which a document fed from the sheet feeding tray is discharged; and a feeding path, through which the document passes when the document is fed from the sheet feeding tray to the sheet discharge tray. The feeding unit is configured to feed the document from the sheet feeding tray to the sheet discharge tray. The image reading apparatus further comprises: a setting detection unit configured to detect that a document is set on the sheet feeding tray; and a downstream-side detection unit that is positioned at a more downstream-side in the feeding path than the setting detection unit. In the first switching process, the control device is configured to perform a document determining process of determining whether the setting detection unit detects that there is the document and the downstream-side detection unit detects that there is no document. When it is determined in the document determining process that the setting detection unit detects that there is the document and the downstream-side detection unit detects that there is no document, the control device is configured to perform the second switching process and the initialization process.

When the switching gear is switched to the feeding unit-side position at a state where the document is set on the sheet feeding tray upon the power fail recovery and the like, the document may get sucked in the feeding unit and may be thus damaged. Therefore, according to the above configuration, when the document is set on the sheet feeding tray, the position of the switching gear is not switched to the feeding unit-side position. Therefore, it is possible to suppress the damage to the document.

(7) The control device is configured to perform an electric power supplying process of controlling an electric power supply to respective units of the image reading apparatus. The control device is configured to perform the first switching process and the second switching process when the electric power supply starts.

According to the above configuration, upon the starting of supplying the electric power, it is possible to securely perform the initialization process of the reading unit by moving the carriage to a predetermined position.

(8) The control device is configured to perform the first switching process and the second switching process in a case where a document jam has occurred when executing the feeding reading and has then been released.

According to the above configuration, when a document jam occurs, it is possible to securely perform the initialization process of the reading unit by moving the carriage to a predetermined position.

(9) The control device is configured to switch the switching gear from the feeding unit-side position to the carriage-side position after an operation of the feeding unit is over.

According to the above configuration, when a next reading operation is the moving reading, it is possible to shorten the time that is consumed to prepare the next reading operation.

(10) The image reading apparatus further comprises: a reading platen, on which the document is set when executing the moving reading; and a detection member configured to detect a home position, which is a reference position of the carriage when executing the moving reading, between the feeding reading position and the reading platen. In the initialization process after the second switching process, the control device is configured to perform a home position detection process of controlling the reading unit to read the detection member so as to detect the home position.

According to the above configuration, it is possible to securely perform the home position detection as the initialization process of the reading unit.

(11) The carriage is configured to be moved from the document reading position at the moving reading in a feeding reading position direction, which is a direction toward the feeding reading position, by a rotation of the motor in a first rotating direction when the switching gear is in the meshing state with the carriage-side transmission gear. The image reading apparatus further comprises a regulation member configured to regulate the moving of the carriage from the feeding reading position when the carriage reaches the feeding reading position. The switching gear is configured to be switched to the meshing state with the feeding unit-side transmission gear by the rotation of the motor in the first rotating direction at a state where the moving of the carriage from the feeding reading position is regulated by the regulation member.

(12) The image reading apparatus further comprises: a prevention mechanism comprising: a support member configured to support the switching gear at a first end thereof; and a spring connected to a second end of the support member. The prevention mechanism is configured to: when the switching gear is at the meshing state with the carriage-side transmission gear, apply contracting force to press the switching gear toward the carriage-side transmission gear; and when the switching gear is at the meshing state with the feeding unit-side transmission gear, apply contracting force to press the switching gear toward the feeding unit-side transmission gear.

According to the above configuration, when performing the initialization process of the reading unit, the carriage is surely located at the feeding reading position. Hence, even though the reading operation is not normally ended, when the motor is enabled to move the carriage for the initialization process of the reading unit, it is possible to appropriately move the carriage to a predetermined position.

What is claimed is:

1. An image reading apparatus comprising:
a reading unit configured to read an image of a document;
a feeding unit configured to feed the document;
a carriage configured to hold the reading unit and move the reading unit in a predetermined direction;
a motor;
a motor-side transmission gear configured to transmit power supplied from the motor;
a carriage-side transmission gear configured to transmit the power to the carriage when executing a moving reading of moving the carriage to read the image of the document;
a feeding unit-side transmission gear configured to transmit the power to the feeding unit when executing a feeding reading of reading the image of the document that is fed by the feeding unit;
a switching gear configured to:
mesh with the feeding unit-side transmission gear at a feeding unit-side position, in which the motor-side transmission gear and the feeding unit-side transmission gear are coupled at a state where the carriage is located at a feeding reading position that is a document reading position, when executing the feeding reading: and
mesh with the carriage-side transmission gear at a carriage-side position, in which the motor-side transmission gear and the carriage-side transmission gear are coupled, when executing the moving reading,
wherein the switching gear is configured to switch between a meshing state with the carriage-side transmission gear and a meshing state with the feeding unit-side transmission gear; and
a control device configured to perform:
a first switching process for meshing the switching gear with the feeding unit-side transmission gear before performing an initialization process of the reading unit;
a second switching process for meshing the switching gear with the carriage-side transmission gear after performing the first switching process; and
the initialization process of the reading unit after performing the second switching process.

2. The image reading apparatus according to claim 1,
wherein the carriage is configured to be moved from the document reading position at the moving reading in a feeding reading position direction, which is a direction toward the feeding reading position, by a rotation of the motor in a first rotating direction,
wherein the image reading apparatus further comprises a regulation member configured to regulate the moving of the carriage from the feeding reading position when the carriage reaches the feeding reading position,
wherein the switching gear is configured to be meshed with the feeding unit-side transmission gear by the rotation of the motor in the first rotating direction at a state where the moving of the carriage from the feeding reading position is regulated by the regulation member, and
wherein in the first switching process, the control device is configured to perform a driving amount determining process comprising:
detecting a driving amount of the motor from a driving starting in the first rotating direction; and
determining whether the driving amount reaches an addition driving amount that is obtained by adding a first driving amount, which is required when the switching gear is switched from the carriage-side position to the feeding unit-side position, and a second driving amount, which corresponds to a maximum moving distance with which the carriage is able to be moved in the feeding reading position direction, and
wherein when it is determined that the driving amount reaches the addition driving amount, the control device is configured to drive the motor in a second rotating direction, which is opposite to the first rotating direction, to perform the second switching process.

3. The image reading apparatus according to claim 2,
wherein the feeding unit comprises:
a sheet feeding tray;
a sheet discharge tray, onto which a document fed from the sheet feeding tray is discharged; and
a feeding path, through which the document passes when the document is fed from the sheet feeding tray to the sheet discharge tray, wherein the feeding unit is configured to feed the document from the sheet feeding tray to the sheet discharge tray, wherein the image reading apparatus further comprises a document detection unit configured to detect whether a document is positioned in the feeding unit, and wherein when it is determined in the driving amount determining process that the driving amount of the motor does not reach the addition driving amount, the control device is configured to perform a document determining process of determining whether a detection result of the document detection unit is changed, and wherein when it is determined in the document determining process that a detection result of the document detection unit is changed, the control device is configured to: control the feeding unit to perform predetermined process; and perform the second switching process after the feeding unit performs the predetermined process.

4. The image reading apparatus according to claim 1, wherein the feeding unit comprises:
   a sheet feeding tray;
   a sheet discharge tray, onto which a document fed from the sheet feeding tray is discharged; and
   a feeding path, through which the document passes when the document is fed from the sheet feeding tray to the sheet discharge tray, wherein the feeding unit is configured to feed the document from the sheet feeding tray to the sheet discharge tray, wherein the image reading apparatus further comprises a document detection unit configured to detect whether a document is positioned in the feeding unit, and wherein in the first switching process, the control device is configured to perform a document determining process of determining whether a detection result of the document detection unit is changed as the motor is driven, and wherein when it is determined in the document determining process that a detection result of the document detection unit is changed, the control device is configured to: control the feeding unit to perform a predetermined process; and
   perform the second switching process after the feeding unit performs the predetermined process.

5. The image reading apparatus according to claim 3, wherein when a detection result of the document detection unit is changed from a result that there is no document to a result that there is a document, the control device is configured to drive the feeding unit to perform a discharge process of discharging the document in the feeding unit onto the sheet discharge tray as the predetermined process, and wherein the control device is configured to perform the second switching process after the feeding unit performs the discharge process.

6. The image reading apparatus according to claim 4, wherein when a detection result of the document detection unit is changed from a result that there is no document to a result that there is a document, the control device is configured to drive the feeding unit to perform a discharge process of discharging the document in the feeding unit onto the sheet discharge tray as the predetermined process, and wherein the control device is configured to perform the second switching process after the feeding unit performs the discharge process.

7. The image reading apparatus according to claim 1, wherein the feeding unit comprises:
   a sheet feeding tray;
   a sheet discharge tray, onto which a document fed from the sheet feeding tray is discharged; and
   a feeding path, through which the document passes when the document is fed from the sheet feeding tray to the sheet discharge tray, wherein the feeding unit is configured to feed the document from the sheet feeding tray to the sheet discharge tray, wherein the image reading apparatus further comprises:
   a setting detection unit configured to detect that a document is set on the sheet feeding tray; and
   a downstream-side detection unit that is positioned at a more downstream-side in the feeding path than the setting detection unit, and wherein in the first switching process, the control device is configured to perform a document determining process of determining whether the setting detection unit detects that there is the document and the downstream-side detection unit detects that there is no document, and wherein when it is determined in the document determining process that the setting detection unit detects that there is the document and the downstream-side detection unit detects that there is no document, the control device is configured to perform the second switching process and the initialization process.

8. The image reading apparatus according to claim 1, wherein the control device is configured to perform an electric power supplying process of controlling an electric power supply to respective units of the image reading apparatus, and wherein the control device is configured to perform the first switching process and the second switching process when the electric power supply starts.

9. The image reading apparatus according to claim 1, wherein the control device is configured to perform the first switching process and the second switching process in a case where a document jam has occurred when executing the feeding reading and has then been released.

10. The image reading apparatus according to claim 1, wherein the control device is configured to switch the switching gear from the feeding unit-side position to the carriage-side position after an operation of the feeding unit is over.

11. The image reading apparatus according to claim 1, further comprising:
   a reading platen, on which the document is set when executing the moving reading; and
   a detection member configured to detect a home position, which is a reference position of the carriage when executing the moving reading, between the feeding reading position and the reading platen, wherein in the initialization process after the second switching process, the control device is configured to perform a home position detection process of controlling the reading unit to read the detection member so as to detect the home position.

12. The image reading apparatus according to claim 1, wherein the carriage is configured to be moved from the document reading position at the moving reading in a feeding reading position direction, which is a direction toward the feeding reading position, by a rotation of the motor in a first rotating direction when the switching gear is in the meshing state with the carriage-side transmission gear, wherein the image reading apparatus further comprises a regulation member configured to regulate the moving of the carriage from the feeding reading position when the carriage reaches the feeding reading position, wherein the switching gear is configured to be switched to the meshing state with the feeding unit-side transmission gear by the rotation of the motor in the first rotating direction at a state where the moving of the carriage from the feeding reading position is regulated by the regulation member.

13. The image reading apparatus according to claim 1, further comprising:
a prevention mechanism comprising:
- a support member configured to support the switching gear at a first end thereof; and
- a spring connected to a second end of the support member, wherein the prevention mechanism is configured to:
  - when the switching gear is at the meshing state with the carriage-side transmission gear, apply contracting force to press the switching gear toward the carriage-side transmission gear; and
  - when the switching gear is at the meshing state with the feeding unit-side transmission gear, apply contracting force to press the switching gear toward the feeding unit-side transmission gear.

14. The image reading apparatus according to claim 1, wherein the carriage-side transmission gear is configured to rotate when the switching gear is in the carriage-side position.

15. The image reading apparatus according to claim 1, wherein the switching gear is a planet gear.

16. The image reading apparatus according to claim 1, wherein the carriage side position and the feeding unit-side position are located between the carriage-side transmission gear and the feed unit-side transmission gear.

* * * * *